United States Patent
Chen et al.

(10) Patent No.: US 9,432,700 B2
(45) Date of Patent: Aug. 30, 2016

(54) ADAPTIVE LOOP FILTERING IN ACCORDANCE WITH VIDEO CODING

(75) Inventors: Peisong Chen, San Diego, CA (US);
Ba-Zhong Shen, Irvine, CA (US);
Wade K. Wan, Orange, CA (US)

(73) Assignee: BROADCOM CORPORATION, Irvine, CA (US)

( * ) Notice: Subject to any disclaimer, the term of this patent is extended or adjusted under 35 U.S.C. 154(b) by 453 days.

(21) Appl. No.: 13/523,830

(22) Filed: Jun. 14, 2012

(65) Prior Publication Data

US 2013/0077697 A1    Mar. 28, 2013

Related U.S. Application Data

(60) Provisional application No. 61/539,666, filed on Sep. 27, 2011.

(51) Int. Cl.
| | |
|---|---|
| *H04N 7/12* | (2006.01) |
| *H04N 19/82* | (2014.01) |
| *H04N 19/176* | (2014.01) |
| *H04N 19/147* | (2014.01) |
| *H04N 19/46* | (2014.01) |

(Continued)

(52) U.S. Cl.
CPC ............ *H04N 19/82* (2014.11); *H04N 19/117* (2014.11); *H04N 19/147* (2014.11); *H04N 19/174* (2014.11); *H04N 19/176* (2014.11); *H04N 19/46* (2014.11); *H04N 19/61* (2014.11)

(58) Field of Classification Search
USPC .................................................. 375/240.25
See application file for complete search history.

(56) References Cited

U.S. PATENT DOCUMENTS

| | | | |
|---|---|---|---|
| 2007/0200626 A1* | 8/2007 | Pedersen | H03F 1/0211 330/251 |
| 2009/0092181 A1* | 4/2009 | Sontowski et al. | 375/232 |

(Continued)

FOREIGN PATENT DOCUMENTS

CN    101325707 A    12/2008

OTHER PUBLICATIONS

McCann, et al.; HM3: High Efficiency Video Coding (HEVC) Test Model 3 Encoder Description; Joint Collaborative Team on Video Coding (JCT-VC) of ITU-T SG16 WP3 and ISO/IEC JTC1/SC29/WG11; Mar. 16-23, 2011; 34 pgs.

(Continued)

*Primary Examiner* — Tracy Li
(74) *Attorney, Agent, or Firm* — Garlick & Markison; Shayne X. Short

(57) ABSTRACT

Adaptive loop filtering in accordance with video coding. An adaptive loop filter (ALF) and/or other in-loop filters (e.g., sample adaptive offset (SAO) filter, etc.) may be implemented within various video coding architectures (e.g., encoding and/or decoding architectures) to perform both offset and scaling processing, only scaling processing, and/or only offset processing. Operation of such an ALF may be selective in accordance with any of multiple respective operational modes at any given time and may be adaptive based upon various consideration(s) (e.g., desired complexity level, processing type, local and/or remote operational conditions, etc.). For example, an ALF may be applied to a decoded picture before it is stored in a picture buffer (or digital teacher buffer (DPB)). An ALF can provide for coding noise reduction of a decoded picture, and the filtering operations performed thereby may be selective (e.g., on a slice by slice basis, block by block basis, etc.).

20 Claims, 16 Drawing Sheets

(51) Int. Cl.
H04N 19/61 (2014.01)
H04N 19/117 (2014.01)
H04N 19/174 (2014.01)

(56) References Cited

U.S. PATENT DOCUMENTS

2010/0098345 A1* 4/2010 Andersson et al. .......... 382/238
2012/0177107 A1* 7/2012 Fu et al. ................. 375/240.03

OTHER PUBLICATIONS

Chen, et al.; Adaptive Loop Filter with Zero Pixel Line Buffers for LCU-based Decoding; Joint Collaborative Team on Video Coding (JCT-VC) of ITU-T SG16 WP3 and ISO/IEC JTC1/SC29/WG11; Jul. 14-22, 2011; 12 pgs.

Young-Joe, et al.; Enhanced Adaptive Loop Filter for Motion Compensated Frame; IEEE Transactions on Image Processing; Aug. 2011; pp. 2177-2188; vol. 20, Iss. 8.

Li, et al.; Complexity Scalable ALF; Joint Collaborative Team on Video Coding (JCT-VC) of ITU-T SG16 WP3 and ISO/IEC JTC1/SC29/WG11; Jul. 14-2, 2011; 10 pgs.

Hyunho et al.; Macroblock-based Adaptive Loop Filter for Video Compression; 2011 IEEE International Conference on Multimedia and Signal Processing; May 14, 2011; pp. 366-369.

European Patent Office, European Search Report; EP Application No. 12005532.2; Dec. 10, 2012; 9 pgs.

* cited by examiner

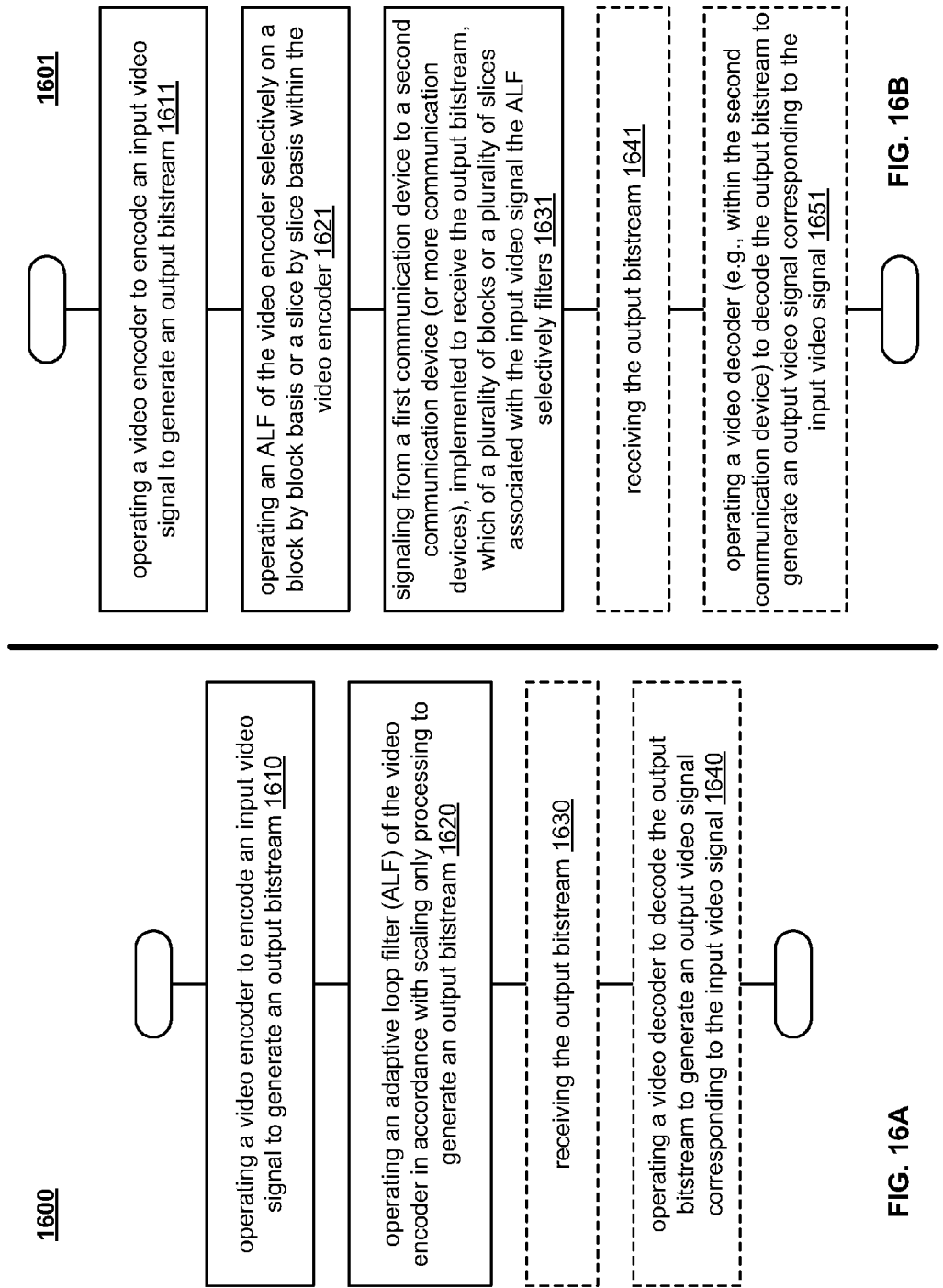

ADAPTIVE LOOP FILTERING IN ACCORDANCE WITH VIDEO CODING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/539,666, entitled "Adaptive loop filtering in accordance with video encoding," filed Sep. 27, 2011.

INCORPORATION BY REFERENCE

The following standards/draft standards are hereby incorporated herein by reference in their entirety and are made part of the present U.S. Utility Patent Application for all purposes:

1. "High efficiency video coding (HEVC) text specification draft 6," Joint Collaborative Team on Video Coding (JCT-VC) of ITU-T SG16 WP3 and ISO/IEC JTC1/SC29/WG11, 7th Meeting: Geneva, CH, 21-30 Nov., 2011, Document: JCTVC-H1003, 259 pages.

2. International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

1. Technical Field of the Invention

The invention relates generally to digital video processing; and, more particularly, it relates to signaling in accordance with such digital video processing.

2. Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed. The present art does not adequately or acceptably provide a means by which video data may be transmitted from a first location to a second location in accordance with providing an adequate or acceptable video and/or image quality, ensuring a relatively low amount of overhead associated with the communications, relatively low complexity of the communication devices at respective ends of communication links, etc.

BRIEF DESCRIPTION OF THE SEVERAL VIEWS OF THE DRAWINGS

FIG. 16A and FIG. 16B illustrate various embodiments of methods performed in accordance with video coding (e.g., within one or more communication devices).

DETAILED DESCRIPTION OF THE INVENTION

Figure 1:
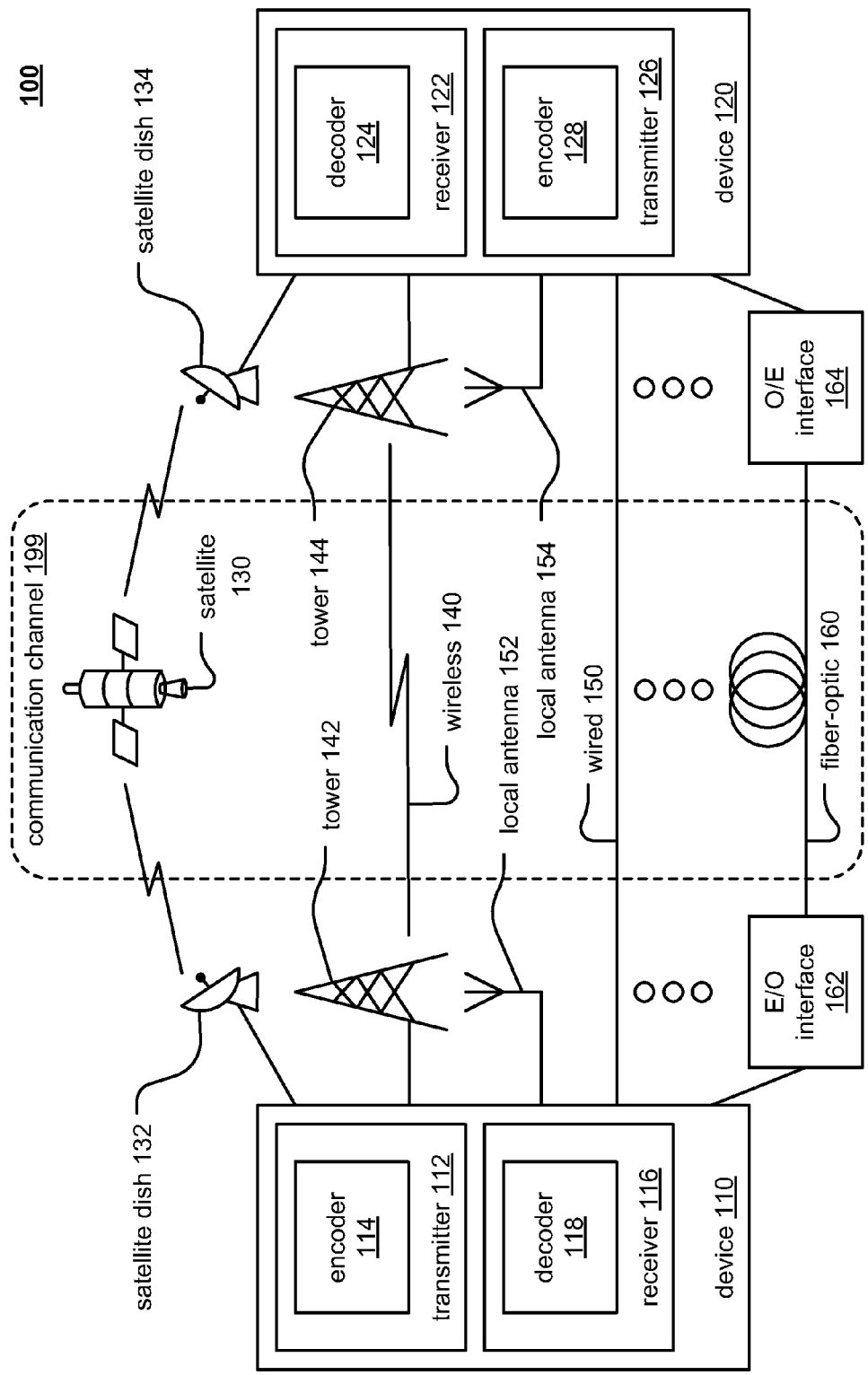
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
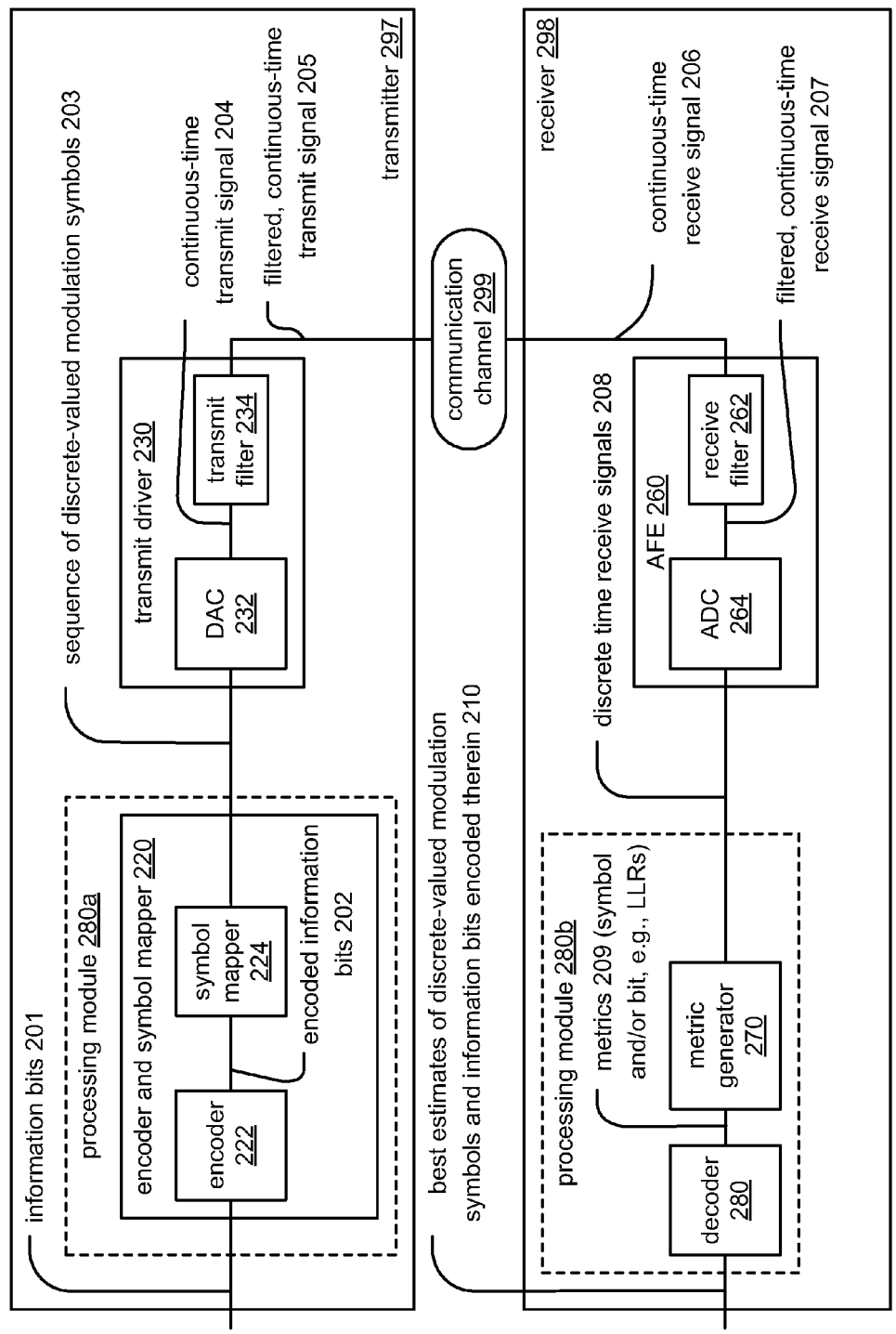

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

Figure 3:
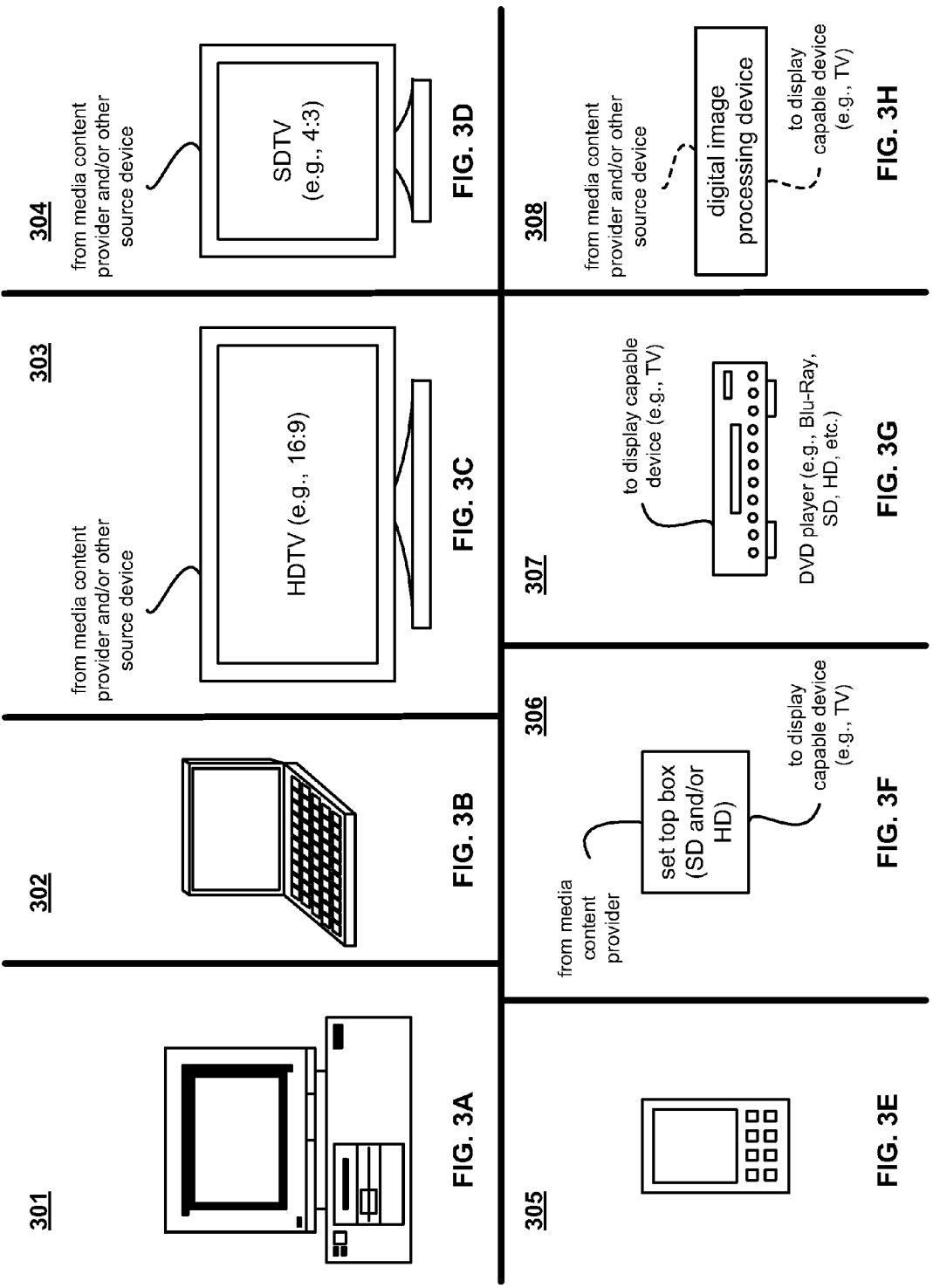
FIG. 3A illustrates an embodiment of a computer.
FIG. 3B illustrates an embodiment of a laptop computer.
FIG. 3C illustrates an embodiment of a high definition (HD) television.
FIG. 3D illustrates an embodiment of a standard definition (SD) television.
FIG. 3E illustrates an embodiment of a handheld media unit.
FIG. 3F illustrates an embodiment of a set top box (STB).
FIG. 3G illustrates an embodiment of a digital video disc (DVD) player.
FIG. 3H illustrates an embodiment of a generic digital image and/or video processing device.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with the computer 301, the laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 305 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
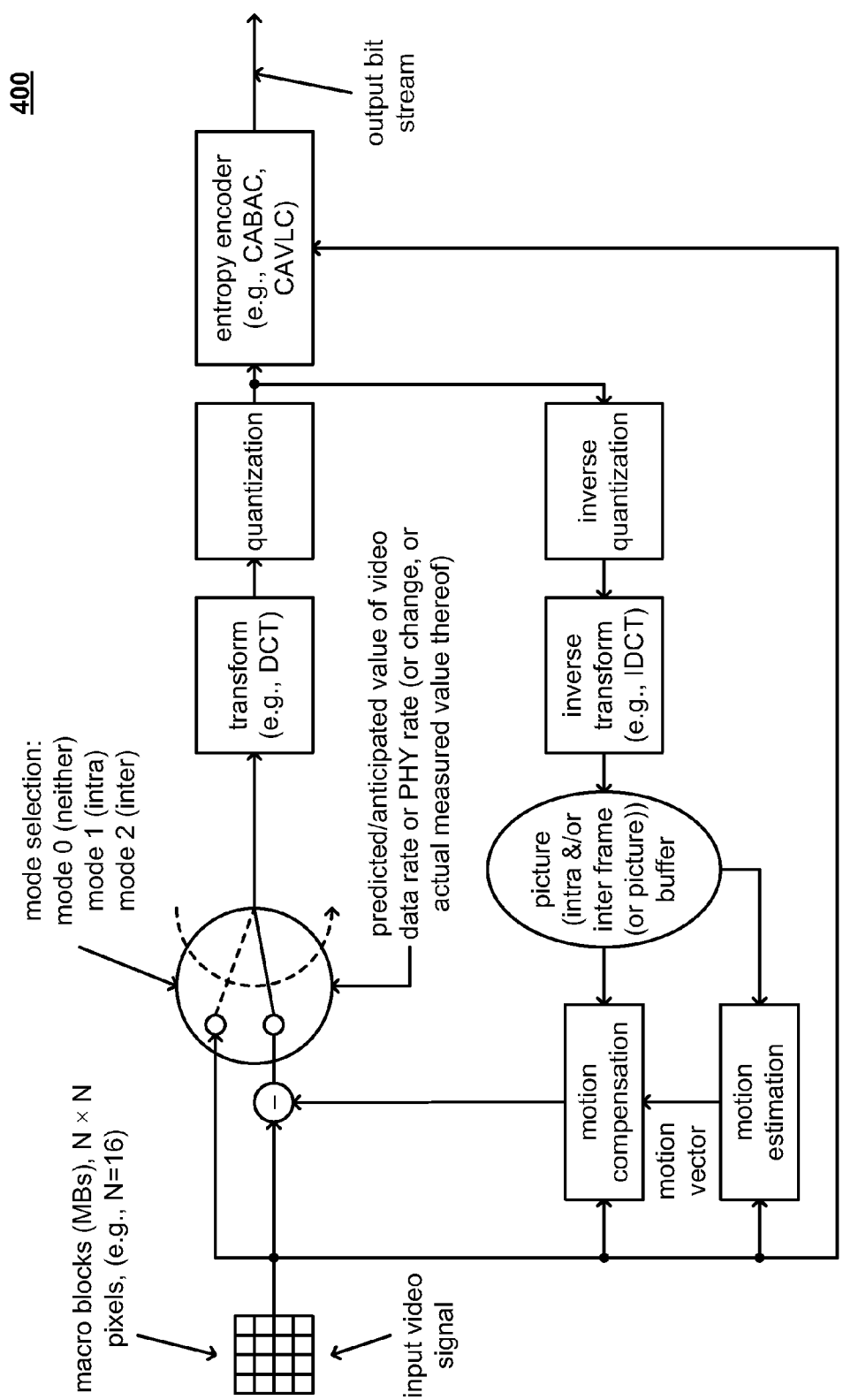
FIG. 4, FIG. 5, and FIG. 6 are diagrams illustrating various embodiments of video encoding architectures.
Figure 5:
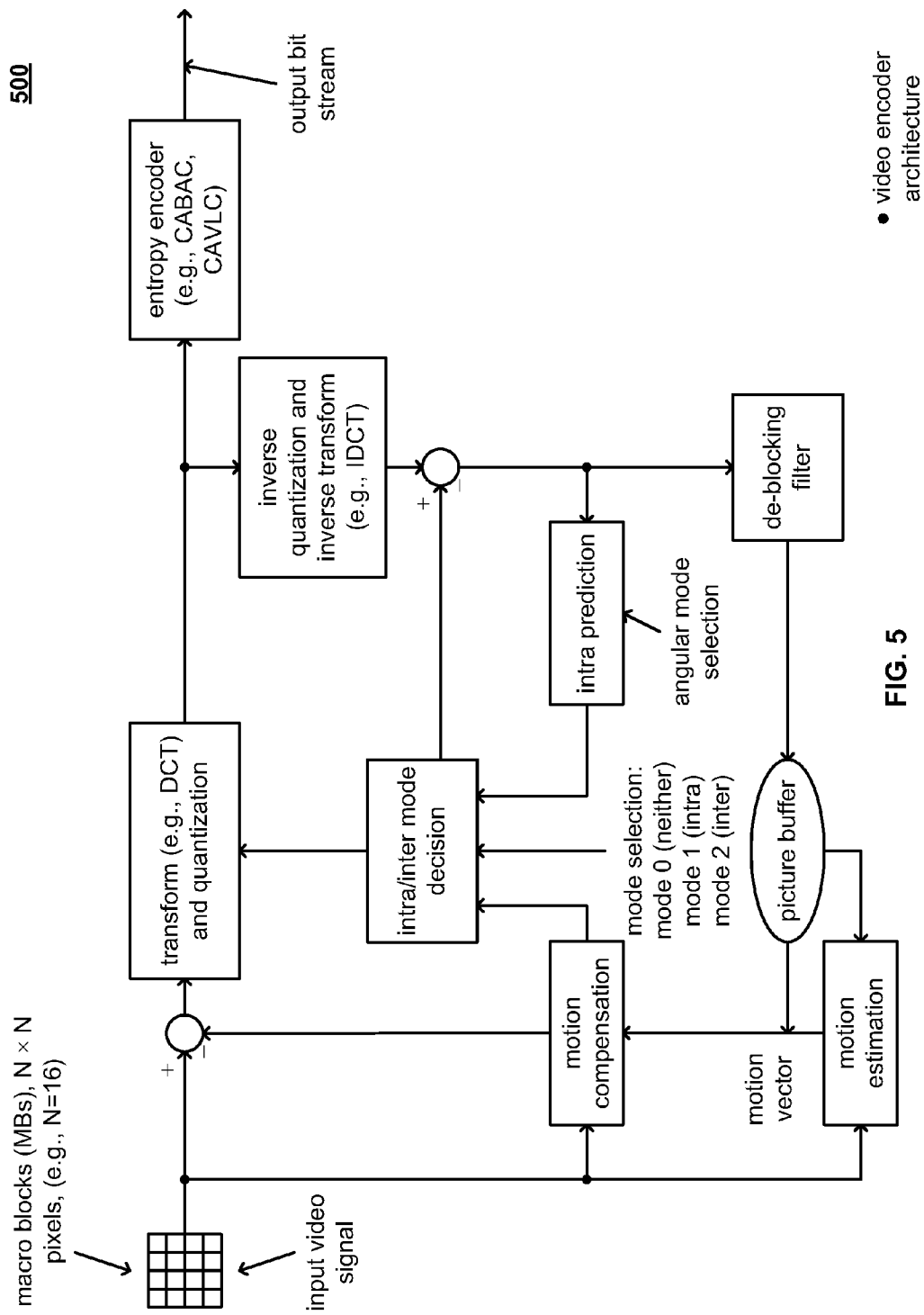
Figure 6:
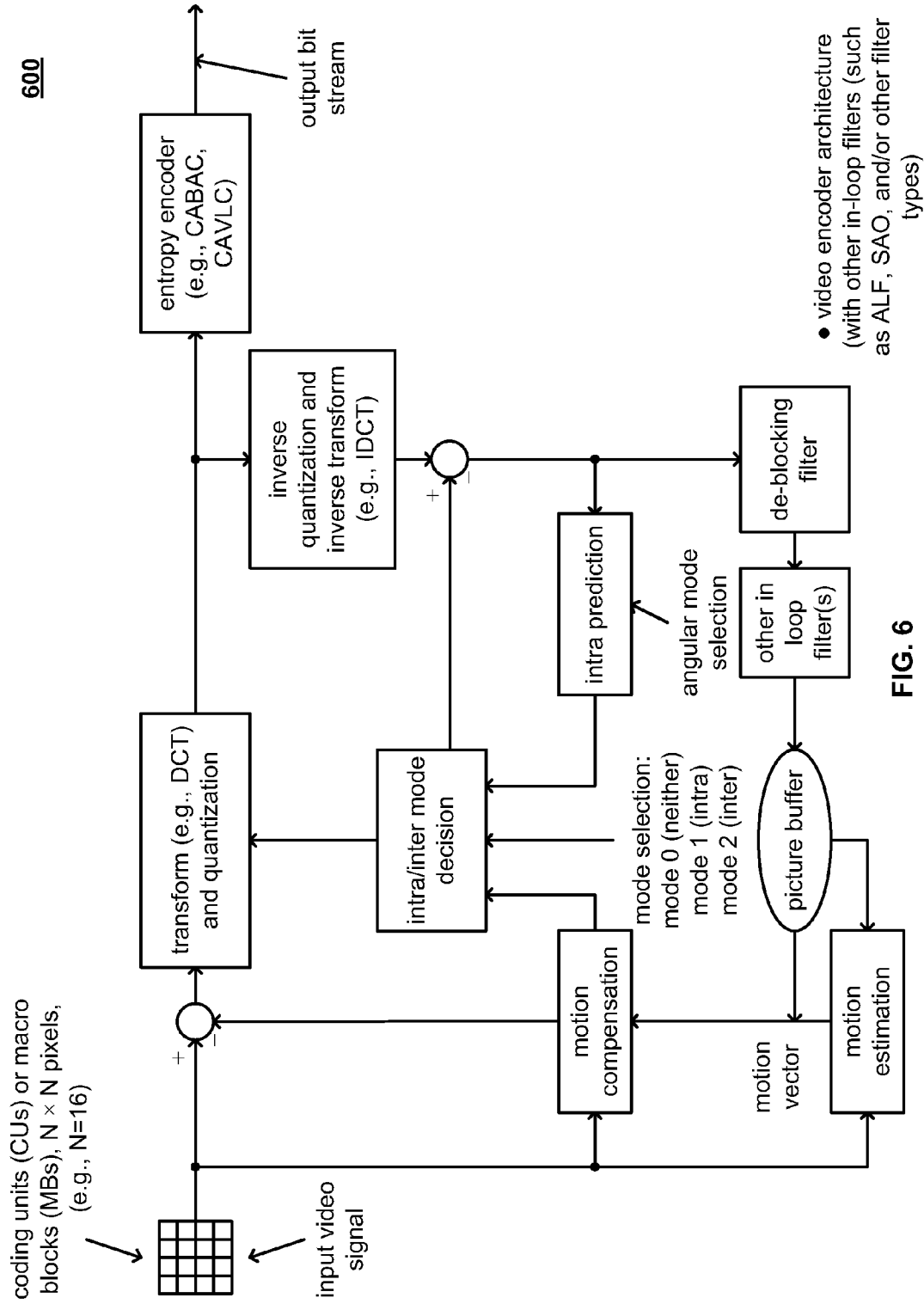

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of coding units or macro-blocks (and/or may be partitioned into coding units (CUs)). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

In certain optional embodiments, the output from the de-blocking filter is provided to one or more other in-loop filters (e.g., implemented in accordance with sample adaptive offset (SAO) filter, adaptive loop filter (ALF), and/or any other filter type) implemented to process the output from the inverse transform block.

For example, such an adaptive loop filter (ALF) may be implemented to process the output from the de-blocking filter, or alternatively such an ALF may be implemented to process the output from a sample adaptive offset (SAO) filter that firstly receives the output from the de-blocking filter. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within an encoder implemented within the transmitter communication device as well as within a decoder implemented within a receiver communication device.

With respect to one type of an in-loop filter, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with finite impulse response (FIR) filtering applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of coding units or macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some nonzero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more nonzero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. Also, motion compensation and/or motion estimation may be performed in accordance with such video encoding.

The signal path output from the inverse quantization and inverse transform (e.g., IDCT) block, which is provided to the intra-prediction block, is also provided to a de-blocking filter. The output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, an ALF is applied to the decoded picture before it is stored in a picture buffer (again, sometimes alternatively referred to as a DPB, digital picture buffer). The ALF is implemented to reduce coding noise of the decoded picture, and the filtering thereof may be selectively applied on a slice by slice basis, respectively, for luminance and chrominance whether or not the ALF is applied either at slice level or at block level. Two-dimensional 2-D finite impulse response (FIR) filtering may be used in application of the ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment generates the coefficients in accordance with Wiener filtering design. In addition, it may be applied on a block by block basis at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with FIR filtering applying a gain) in accordance with ALF processing.

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel. That is to say, such a video encoder architecture may be implemented within a communication device operative to perform transmission of one or more signals via one or more communication channels. Additional processing may be made on an output bitstream generated by such a video encoder architecture thereby generating a continuous time signal that may be launched into a communication channel.

Figure 7:
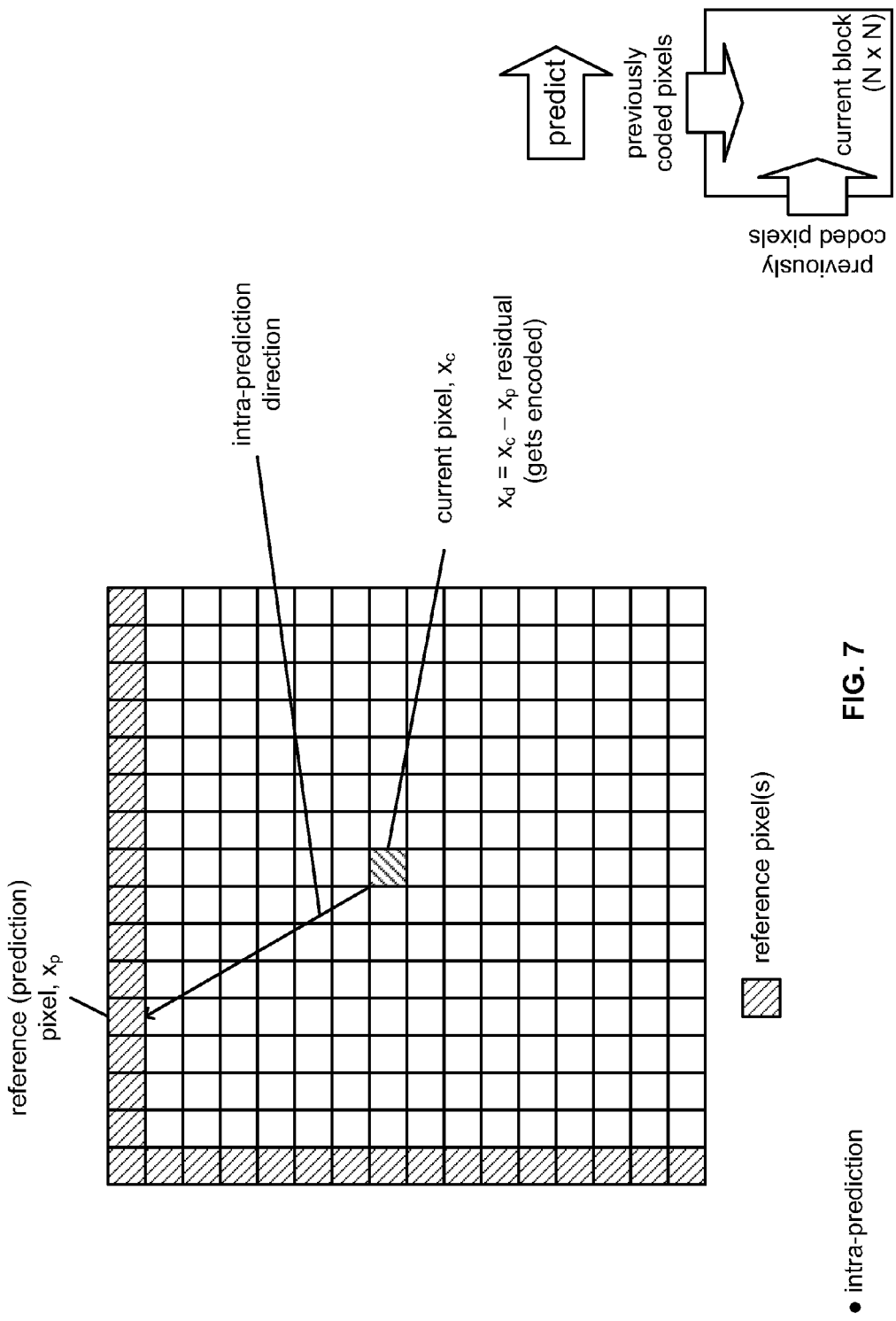
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
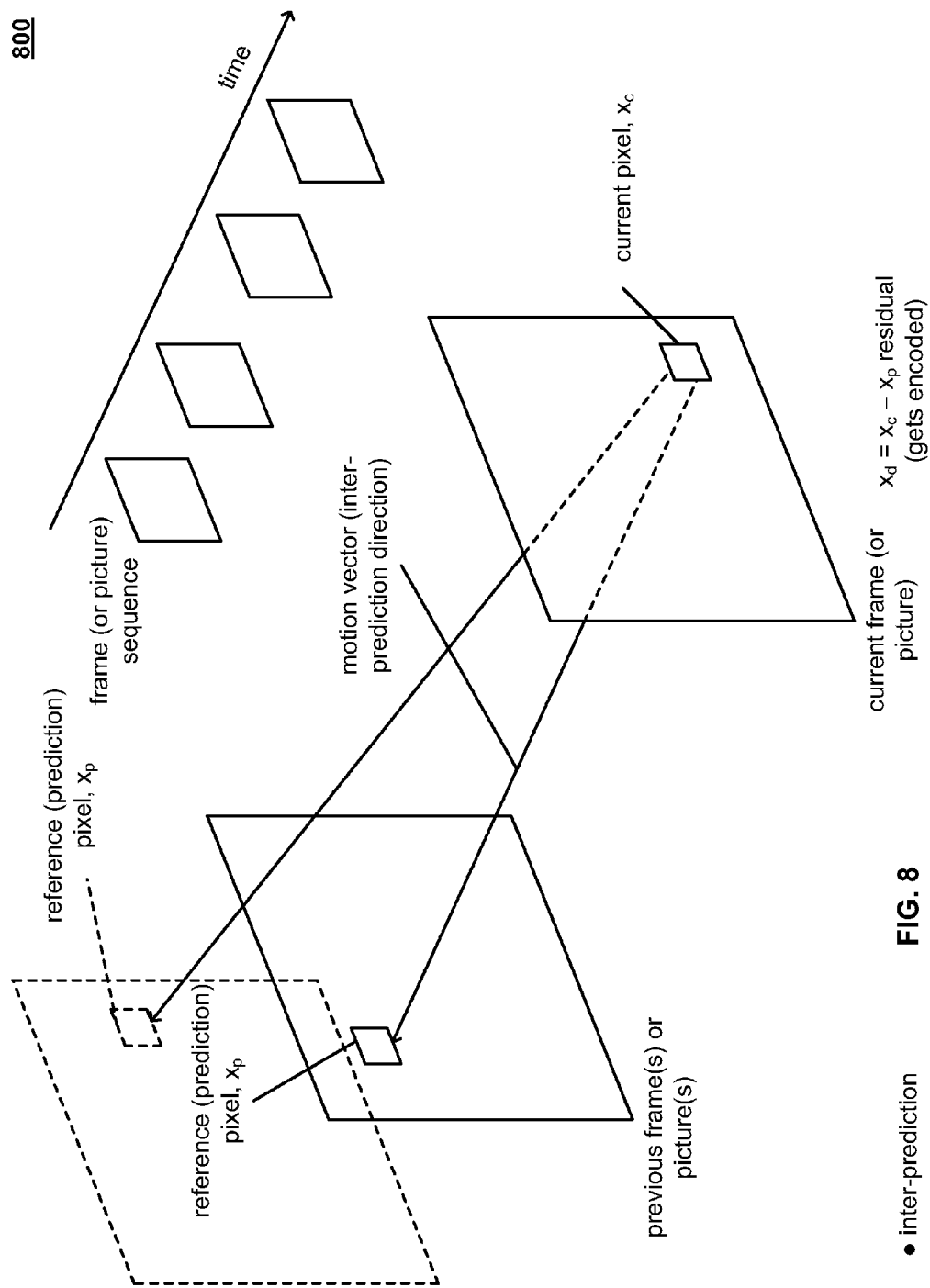
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
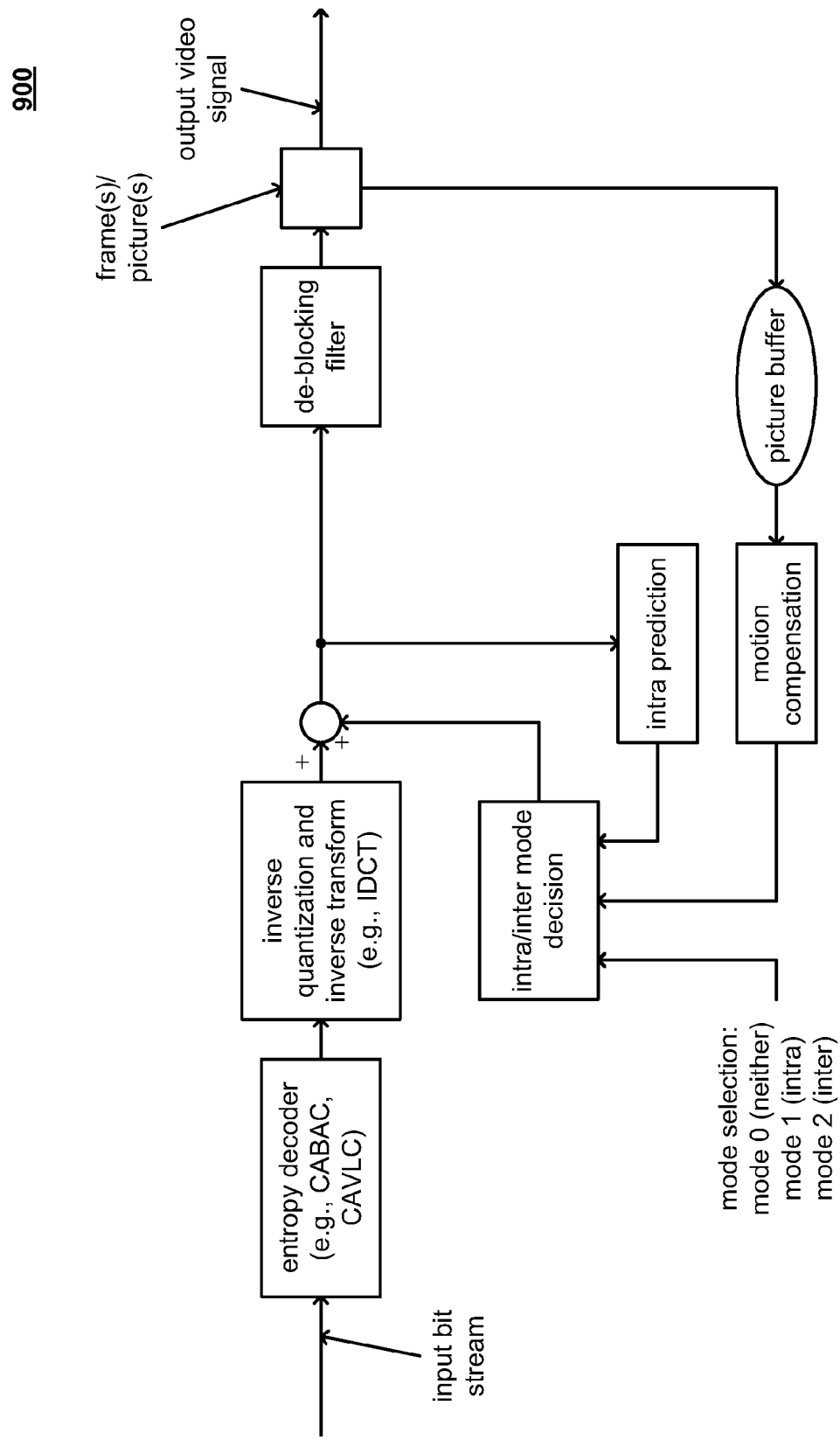
FIG. 9 and FIG. 10 are diagrams illustrating various embodiments of video decoding architectures.
Figure 10:
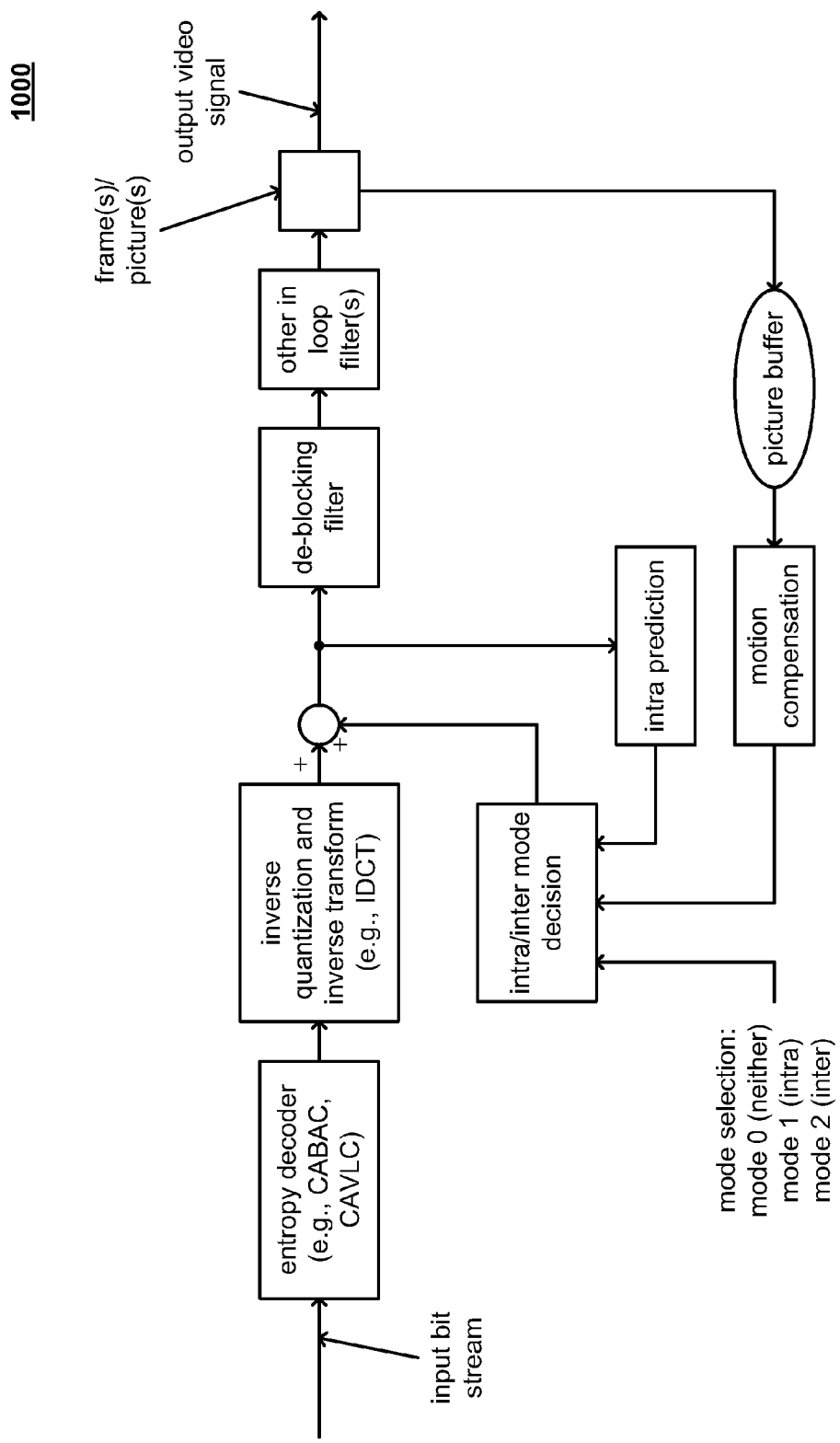

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in certain optional embodiments, one or more in-loop filters (e.g., implemented in accordance with sample adaptive offset (SAO) filter, adaptive loop filter (ALF), and/or any other filter type) such as may be implemented in accordance with video encoding as employed to generate an output bitstream, and a corresponding one or more in-loop filters may be implemented within a video decoder architecture. In one embodiment, an appropriate implementation of one or more such in-loop filters is after the de-blocking filter.

FIG. 11, FIG. 12, FIG. 13, FIG. 14, and FIG. 15 are diagrams illustrating various embodiments 1100, 1200, 1300, 1400, and 1500, respectively, of video encoding architectures each respectively including adaptive loop filtering.

Figure 11:
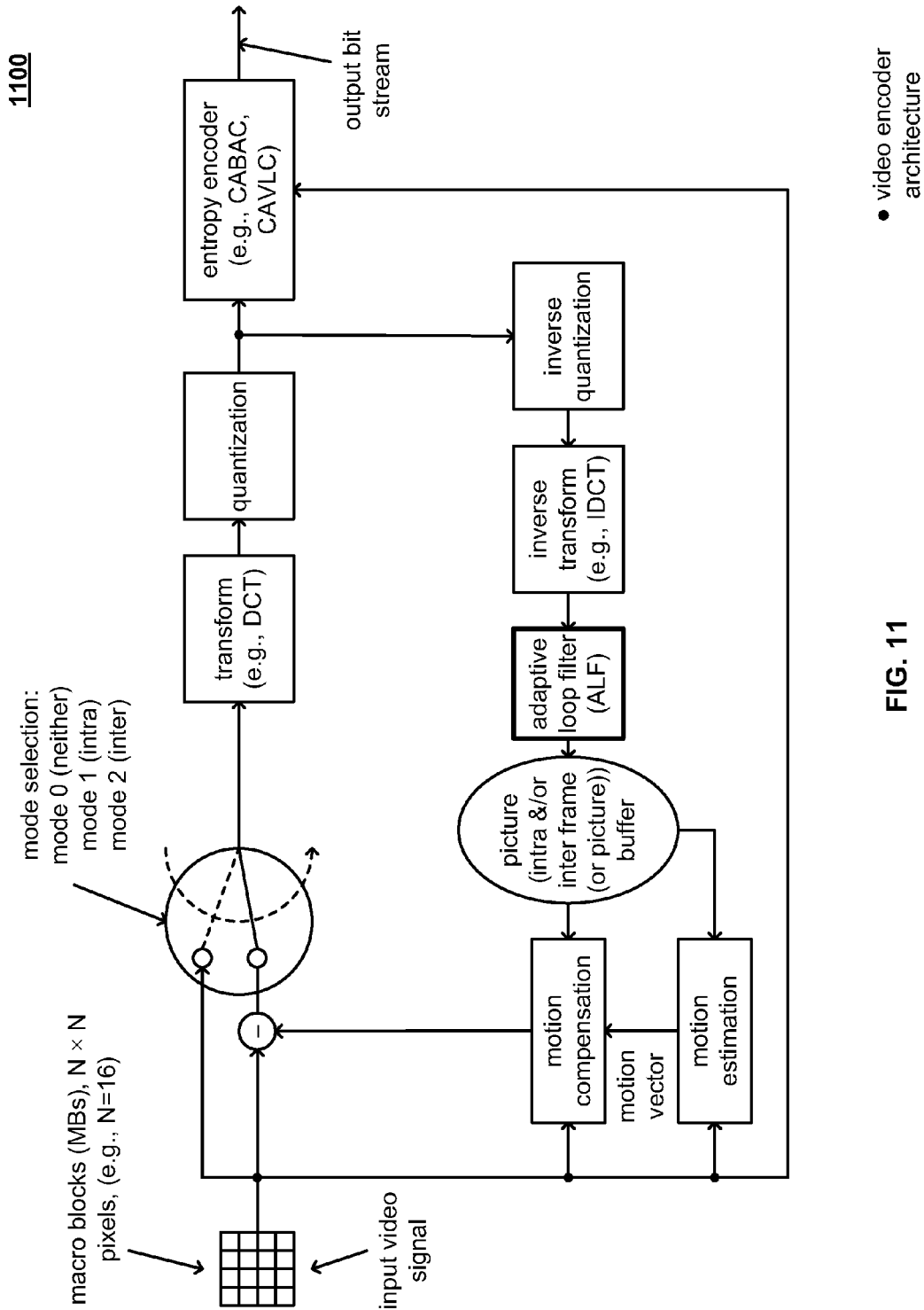
FIG. 11, FIG. 12, FIG. 13, FIG. 14, and FIG. 15 are diagrams illustrating various embodiments of video encoding architectures each respectively including adaptive loop filtering.

The embodiment 1100 of FIG. 11 has some similarities to the embodiment 400 of FIG. 4, with at least one difference being that an adaptive loop filter (ALF) is implemented to process the output from the inverse transform block. For example, such an adaptive loop filter (ALF) is applied to the decoded picture before it is stored in a picture buffer (sometimes referred to as a DPB, digital picture buffer).

As may be understood herein, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and/or scaling processing (e.g., in accordance with FIR filtering applying a gain) in accordance with adaptive loop filter (ALF) processing.

It is noted that the subjective quality improvement arising from illumination compensation is often times more visually significant than that which is associated by the improvement on objective quality measure by PSNR arising from random quantization noise removal. With respect to the offset processing and scaling processing as may be performed in accordance with adaptive loop filtering, such as by an ALF, illumination compensation which provides more significantly for the subjective quality improvement in a resulting video encoded signal, such illumination compensation may be performed using only offset processing in certain embodiments. That is to say, of the various operations that may be performed in accordance with adaptive loop filtering, such as by an ALF, offset processing alone may be used in certain embodiments to achieve the most substantially contributing subjective quality improvement arising from illumination compensation. While an ALF may be implemented in a variety of different ways in different embodiments, including performing both offset processing and scaling processing in one embodiment, performing only offset processing in another embodiment, and performing only scaling processing in yet another embodiment, a significant improvement in perceptual quality of the video encoded signal may be achieved using only offset processing in accordance with operation of such an ALF.

In certain embodiments, such an ALF may be implemented to be selectively operable in accordance with a number of different operational modes, namely, a first mode in which only offset processing is performed, a second mode in which both offset processing and scaling processing are performed, and a third mode in which only scaling processing is performed. Depending upon which of these operational modes is employed in generating a given video encoded signal, that information may be relayed and communicated to a decoder so that the decoder knows appropriately the manner by which the video encoded signal is generated. It is noted that those implementations in which an ALF is implemented such that it performs only offset processing can have relatively reduced complexity when compared to those implementations in which an ALF is implemented that performs both offset processing and scaling processing. As may also be understood, implementing an ALF that is selectively operable in accordance with multiple operational modes may have some increase complexity when compared to other embodiments not including such selective operation. With respect to architectures or designs in which a relatively low degree of complexity is desired, such an ALF may be implemented therein that performs only offset processing.

In accordance with the operation of such an ALF, the rate-distortion optimization referred to above that is operative to determine the ALF filtering map and filter coefficients can also be employed and operative to determine the respective ALF offset map and offset values. The offset map of such an ALF indicates the region where each offset value applies. In embodiments including an ALF that is implemented to perform only offset processing, such operation of an offset only ALF can be signaled separately or as a special case of ALF in the sequence parameter set, picture parameter set, and/or slice level parameter set, etc.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

Figure 12:
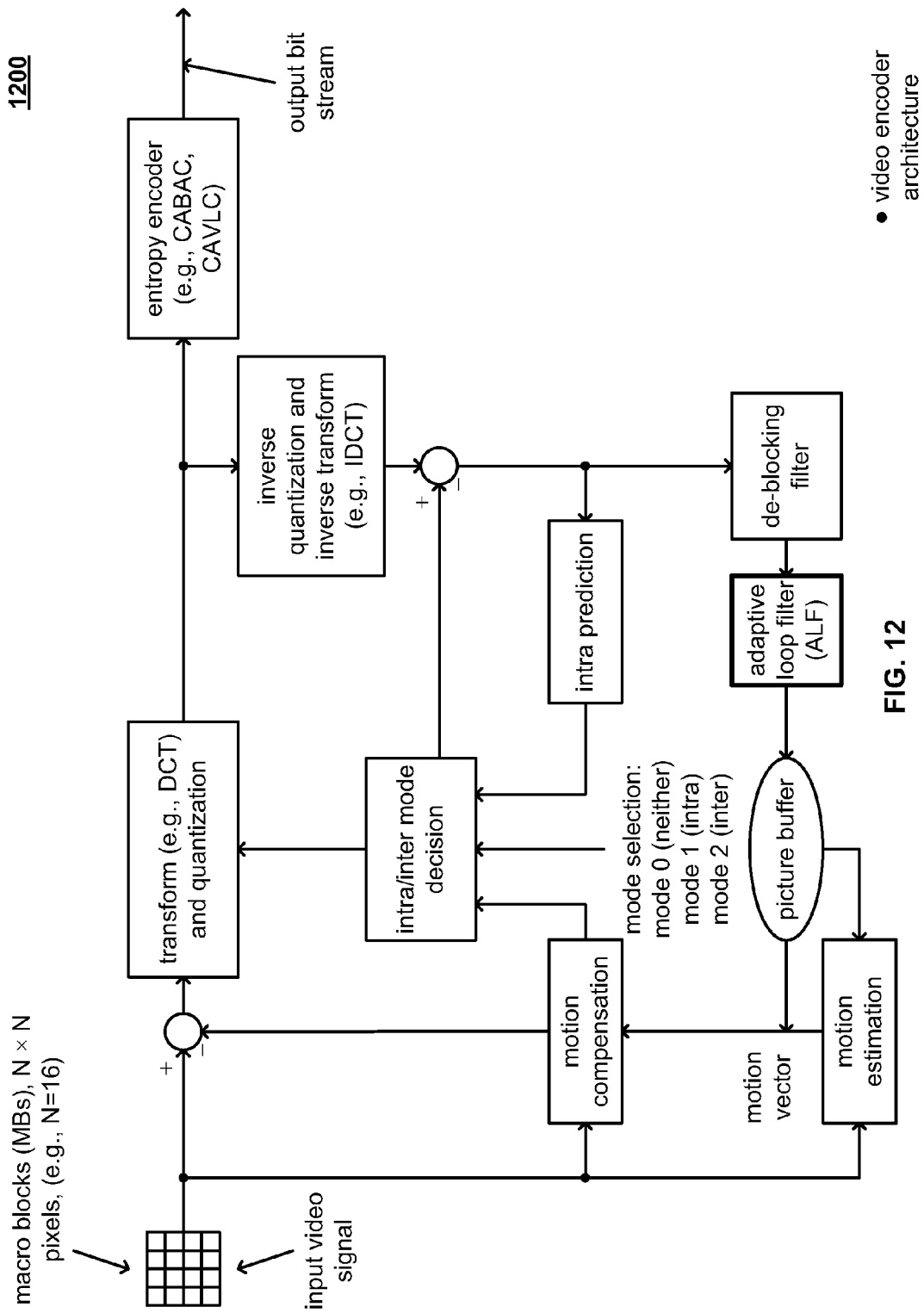

The embodiment 1200 of FIG. 12 has some similarities to the embodiment 500 of FIG. 5, with at least one difference being that an adaptive loop filter (ALF) is implemented to process the output from the de-blocking filter. For example, with reference to the embodiment 600 of FIG. 6, the block corresponding to other in loop filter(s) may be viewed as being implemented as an adaptive loop filter (ALF) in the embodiment 1200 of FIG. 12.

Figure 13:
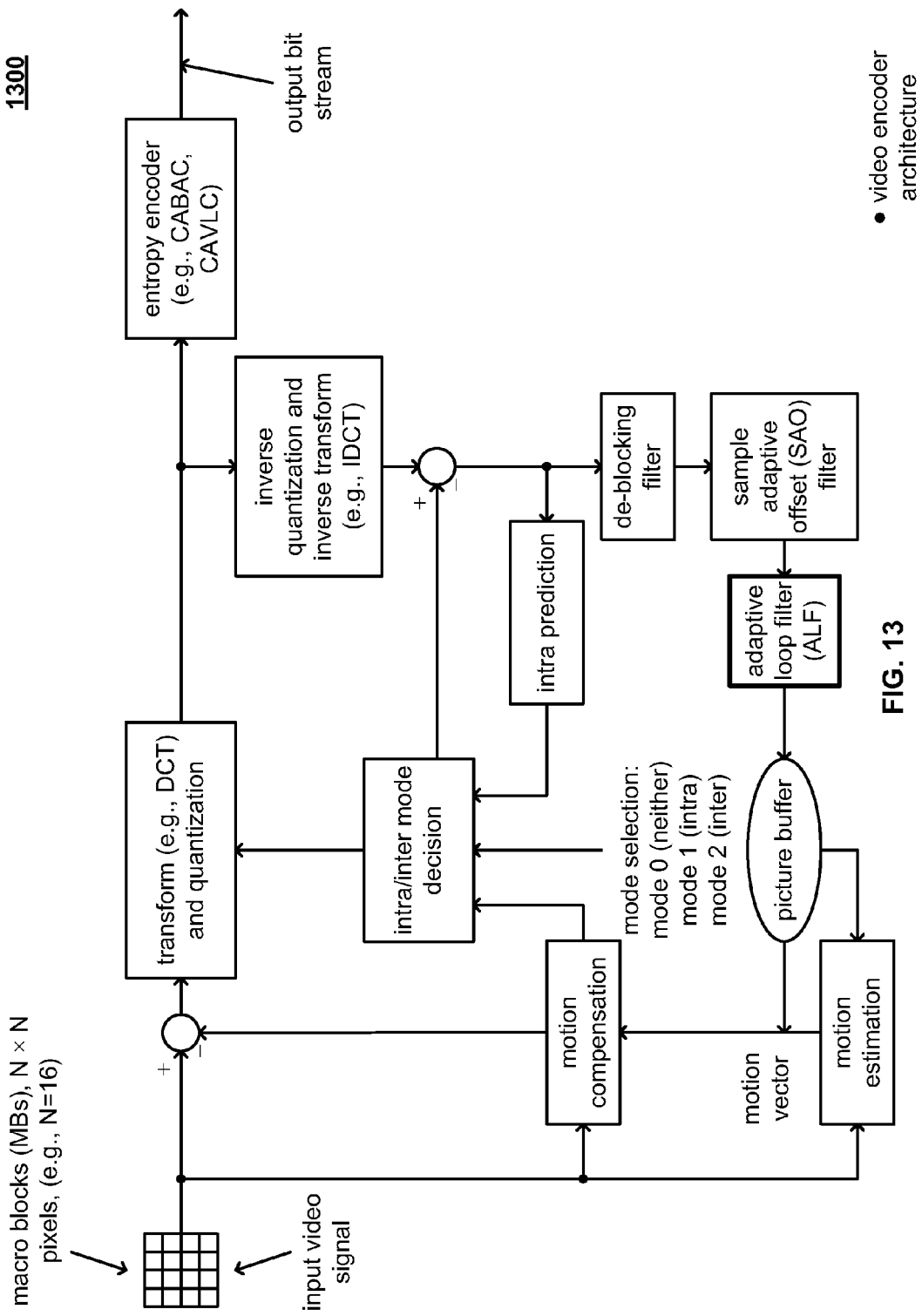

The embodiment 1300 of FIG. 13 has some similarities to the embodiment 500 of FIG. 5 (e.g., with at least some differences being that a sample adaptive offset (SAO) filter and an adaptive loop filter (ALF) are implemented to process the output from the de-blocking filter). For example, with reference to the embodiment 600 of FIG. 6, the block corresponding to other in loop filter(s) may be viewed as being implemented as including both of a sample adaptive offset (SAO) filter and an adaptive loop filter (ALF) in the embodiment 1300 of FIG. 13. As may be seen with respect to this embodiment 1300, the sample adaptive offset (SAO) filter is implemented to process the output from the de-blocking filter, and the adaptive loop filter (ALF) is implemented to process the output from the sample adaptive offset (SAO) filter.

Figure 14:
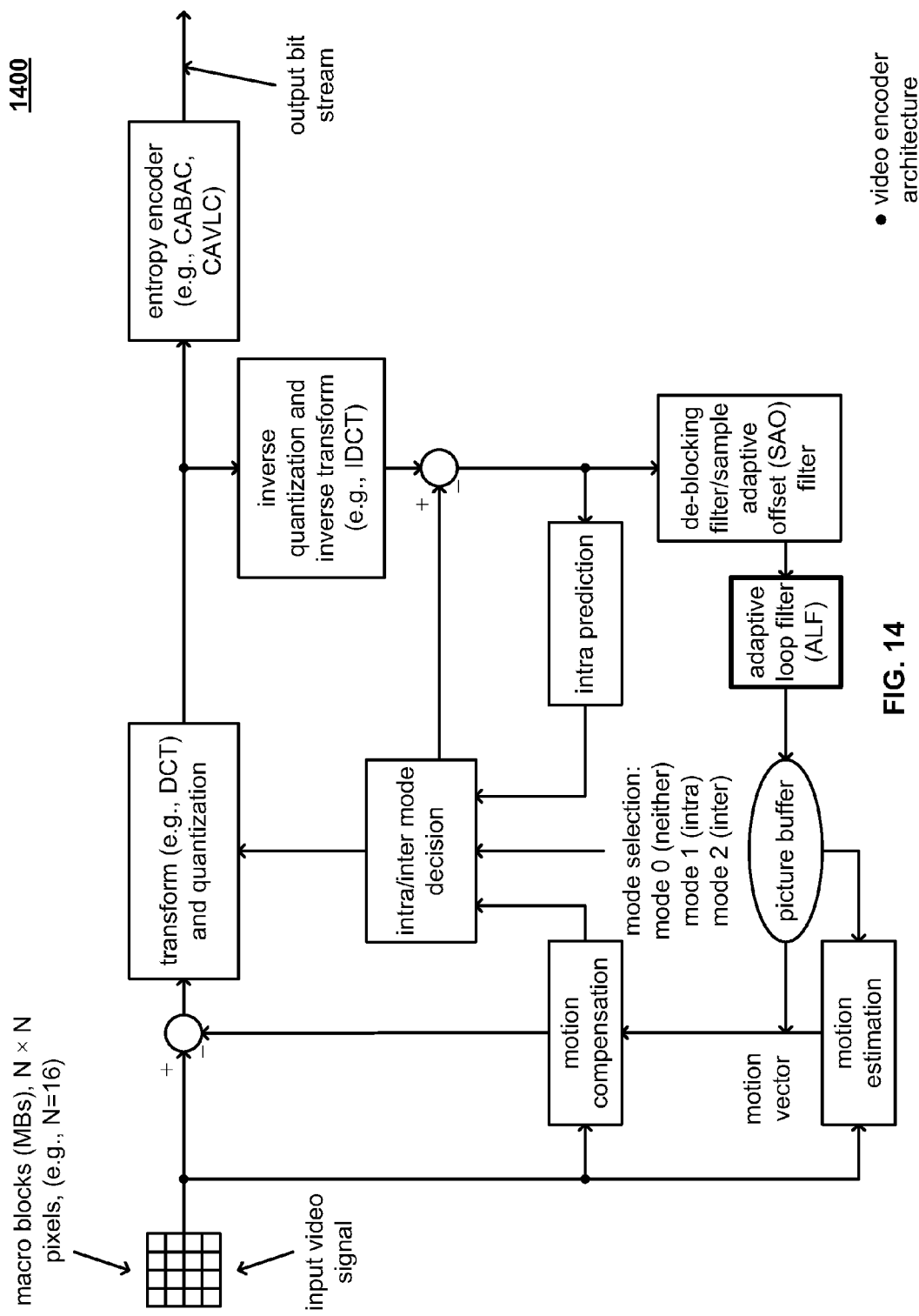

The embodiment 1400 of FIG. 14 has some similarities to the embodiment 500 of FIG. 5 (e.g., with at least some differences being that a de-blocking filter/sample adaptive offset (SAO) filter and an adaptive loop filter (ALF) are implemented to process the signal that is also provided to the intra prediction block). For example, in this diagram, a de-blocking filter/sample adaptive offset (SAO) filter is implemented to provide its output to other in loop filter(s) (e.g., such as with reference to the embodiment 600 of FIG. 6). For example, such a block corresponding to other in loop filter(s) may be viewed as being implemented as including an adaptive loop filter (ALF) in the embodiment 1400 of FIG. 14. As may be seen with respect to this embodiment 1400, the adaptive loop filter (ALF) is implemented to process the output from the de-blocking filter/sample adaptive offset (SAO) filter (e.g., from a de-blocking filter and/or a sample adaptive offset (SAO) filter).

Figure 15:
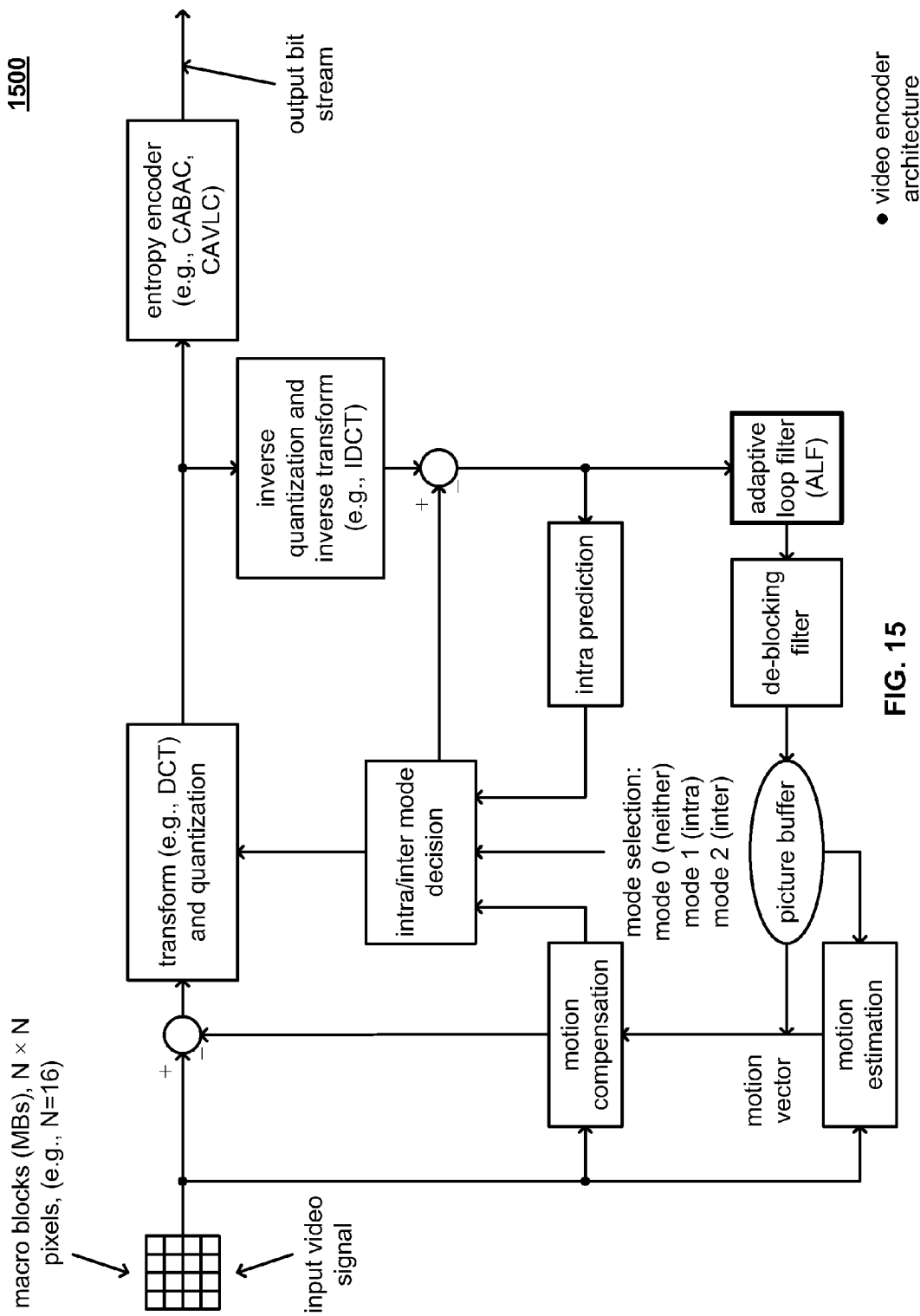

Referring to embodiment 1500 of FIG. 15, with respect to this diagram depicting an alternative embodiment of a video encoder, the embodiment 1500 has many similarities to the embodiment 1200 of FIG. 12, with at least one difference being that the ALF therein is implemented before the de-blocking filter block. With respect to this embodiment 1500, by employing an offset only ALF, without performing scaling processing, such an implementation of an ALF may be implemented before the de-blocking filter block.

As may be understood with respect to the various diagrams and/or embodiments described herein, different limitations of an ALF may be employed in accordance with video coding processing. In some embodiments, an ALF is implemented as an offset only ALF. In other embodiments, an ALF is implemented for performing both offset processing and scaling processing. In some embodiments, an ALF is implemented to perform scaling processing (e.g., finite impulse response (FIR) filtering). An even other embodiments, an ALF may be implemented to be selectively operable in accordance with different operational modes, including a first mode in which only offset processing is performed, a second mode in which both offset processing and scaling processing are performed, and a third mode in which only scaling processing is performed. For example, such operation of such an ALF may be selected based upon any of a number of considerations including desired complexity of a device, latency of the communication channel into which the output bitstream or a signal corresponding thereto is to be launched, available processing resources within such a device, and/or any other consideration. If desired, certain embodiments may implement an ALF having selective capability such that only one of the capabilities is enabled at a time. For example, a common video coding architecture and/or circuitry may be implemented within a number of different types of devices and for use in a number of different applications. In a first device operative within a first application, the first operational mode of the ALF may be enabled therein. In a second device operative within a second application, a second operational mode of the ALF may be enabled therein. As may be understood, such a manufacturer could design a single video coding architecture and/or circuitry for use in a wide variety of devices operative within a wide variety of applications.

FIG. 16A and FIG. 16B illustrate various embodiments of methods performed in accordance with video coding (e.g., within one or more communication devices).

Referring to method 1600 of FIG. 16A, the method 1600 begins by operating a video encoder to encode an input video signal to generate an output bitstream, as shown in a block 1610. The method 1600 continues by operating an adaptive loop filter (ALF) of the video encoder in accordance with scaling only processing to generate an output bitstream, as shown in a block 1620.

In certain alternative embodiments, the method 1600 may be operative to operate by receiving the output bitstream, as shown in a block 1630. In such embodiments, the method 160 may continue by operating a video decoder to decode the output bitstream to generate an output video signal corresponding to the input video signal, as shown in a block 1640.

Referring to method 1601 of FIG. 16B, the method 1601 begins by operating a video encoder to encode an input video signal to generate an output bitstream, as shown in a block 1611. The method 1601 then operates by operating an ALF of the video encoder selectively on a block by block basis or a slice by slice basis within the video encoder, as shown in a block 1621.

The method 1601 continues by signaling from a first communication device to a second communication device (or more communication devices), implemented to receive the output bitstream, which of a plurality of blocks or a plurality of slices associated with the input video signal the ALF selectively filters, as shown in a block 1631.

In certain alternative embodiments, the method 1600 may be operative to operate The method 1601 then operates by receiving the output bitstream, as shown in a block 1641. In such embodiments, the method 1601 may continue by operating a video decoder (e.g., within the second communication device) to decode the output bitstream to generate an output video signal corresponding to the input video signal, as shown in a block 1651.

It is also noted that the various operations and functions as described with respect to various methods herein may be performed within a communication device, such as using a baseband processing module and/or a processing module implemented therein and/or other component(s) therein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
a video encoder configured to encode an input video signal to generate an output bitstream that is representative of the input video signal, wherein the video encoder further includes:
at least one feedback loop having a sample adaptive offset (SAO) filter and an adaptive loop filter (ALF), wherein the ALF is configured to perform only scaling processing and the ALF is implemented to receive a SAO-filtered output signal from the SAO filter, and wherein:
the ALF is configured selectively to operate on a block by block basis or a slice by slice basis within the video encoder;
the apparatus configured to signal to at least one additional apparatus, which is implemented to receive the output bitstream, which subset of a plurality of blocks or which subset of a plurality of slices associated with the input video signal that have been selectively filtered by the ALF, wherein the at least one additional apparatus is implemented to receive the output bitstream and to decode the output bitstream to recover the input video signal; and
the ALF configured to perform only scaling processing to perform illumination compensation using at least one gain value to remove at least one amount of quantization noise during encoding of the input video signal to generate the output bitstream having at least one least one quality.

2. The apparatus of claim 1 further comprising:
the ALF selectively configured selectively to operate using scaling only processing, offset only processing, and both scaling and offset processing.

3. The apparatus of claim 1, wherein the ALF is further configured to: perform illumination compensation using a first gain value to remove a first amount of quantization noise during encoding of the input video signal to generate the output bitstream at a first quality; and
perform illumination compensation using a second gain value to remove a second amount of quantization noise during encoding of the input video signal to generate the output bitstream at a second quality.

4. The apparatus of claim 1 further comprising:
a first communication device, wherein:
the at least one additional apparatus is a second communication device, which is in communication with the first communication device via at least one communication channel, including:
an input configured to receive the output bitstream; and
a video decoder configured to decode the output bitstream to generate an output video signal corresponding to the input video signal, wherein the video decoder including at least one additional feedback loop having at least one additional ALF configured to operate using only scaling processing, wherein the second communication device is at least one of computer, a laptop computer, a high definition (HD) television, a standard definition (SD) television, a handheld media unit, a set top box (STB), or a digital video disc (DVD) player.

5. The apparatus of claim 1 further comprising:
a communication device that is operative within at least one of a satellite communication system, a wireless communication system, a wired communication system, a fiber-optic communication system, or a mobile communication system.

6. An apparatus comprising:
a video encoder configured to encode an input video signal to generate an output bitstream that is representative of the input video signal, wherein the video encoder further includes at least one feedback loop having an adaptive loop filter (ALF) configured to operate using only scaling processing, wherein the ALF configured to perform illumination compensation using at least one gain value to remove at least one amount of quantization noise during encoding of the input video signal to generate the output bitstream having at least one least one quality.

7. The apparatus of claim 6 further comprising:
the ALF is configured selectively to operate on a block by block basis or a slice by slice basis within the video encoder; and
the apparatus configured to signal to at least one additional apparatus, which is implemented to receive the output bitstream, which subset of a plurality of blocks or which subset of a plurality of slices associated with the input video signal that have been selectively filtered by the ALF, wherein the at least one additional apparatus is implemented to receive the output bitstream and to decode the output bitstream to recover the input video signal.

8. The apparatus of claim 6 further comprising:
a sample adaptive offset (SAO) filter that is also included within the at least one feedback loop having the ALF, and the ALF is implemented to receive a SAO-filtered output signal from the SAO filter; and
the ALF configured selectively to operate using scaling only processing, offset only processing, and both scaling and offset processing.

9. The apparatus of claim 6 further comprising:
a sample adaptive offset (SAO) filter that is also included within the at least one feedback loop having the ALF, and the ALF is implemented to receive a SAO-filtered output signal from the SAO filter.

10. The apparatus of claim 6 further comprising:
a sample adaptive offset (SAO) filter that is also included within the at least one feedback loop having the ALF, and the ALF is implemented to receive a SAO-filtered output signal from the SAO filter; and
the ALF configured to:
perform only scaling processing to perform illumination compensation using a first gain value to remove a first amount of quantization noise during encoding of the input video signal to generate the output bitstream at a first quality; and
perform only scaling processing to perform illumination compensation using a second gain value to remove a second amount of quantization noise during encoding of the input video signal to generate the output bitstream at a second quality.

11. The apparatus of claim 6 further comprising:
a first communication device, wherein:
a second communication device, which is in communication with the first communication device via at least one communication channel, including:
an input configured to receive the output bitstream; and
a video decoder configured to decode the output bitstream to generate an output video signal corresponding to the input video signal, wherein the video decoder including at least one additional feedback loop having at least one additional ALF configured to operate using only scaling processing.

12. The apparatus of claim 11, wherein the second communication device is at least one of computer, a laptop computer, a high definition (HD) television, a standard definition (SD) television, a handheld media unit, a set top box (STB), or a digital video disc (DVD) player.

13. The apparatus of claim 6 further comprising:
a communication device that is operative within at least one of a satellite communication system, a wireless communication system, a wired communication system, a fiber-optic communication system, or a mobile communication system.

14. A method for execution by a video encoder of a communication device, the method comprising:
operating the video encoder to encode an input video signal to generate an output bitstream that is representative of the input video signal; and
operating an adaptive loop filter (ALF) that is implemented within a at least one feedback loop of the video encoder using only scaling processing, wherein the ALF is included within a feedback loop of the video encoder including performing illumination compensation using at least one gain value to remove at least one amount of quantization noise during encoding of the input video signal to generate the output bitstream having at least one least one quality.

15. The method of claim 14 further comprising:
operating the ALF selectively on a block by block basis or a slice by slice basis within the video encoder; and
signaling from the communication device to at least one additional communication device, which is implemented to receive the output bitstream, which subset of a plurality of blocks or which subset of a plurality of slices associated with the input video signal that have been selectively filtered by the ALF, wherein the at least one additional communication device is implemented to receive the output bitstream and to decode the output bitstream to recover the input video signal.

16. The method of claim 14 further comprising:
operating a sample adaptive offset (SAO) filter, which is also included within the at least one feedback loop having the ALF, to generate and provide a SAO-filtered output signal to the ALF; and operating the ALF selectively using scaling only processing, offset only processing, and both scaling and offset processing.

17. The method of claim 14 further comprising:
operating a sample adaptive offset (SAO) filter, which is also included within the at least one feedback loop having the ALF, to generate and provide a SAO-filtered output signal to the ALF.

18. The method of claim 14 further comprising:
operating a sample adaptive offset (SAO) filter, included within the at least one feedback loop having the ALF, to generate and provide a SAO-filtered output signal to the ALF; and
operating the ALF to perform only scaling processing to:
  perform illumination compensation using a first gain value to remove a first amount of quantization noise during encoding of the input video signal to generate the output bitstream at a first quality; and
  perform illumination compensation using a second gain value to remove a second amount of quantization noise during encoding of the input video signal to generate the output bitstream at a second quality.

19. The method of claim 14 further comprising:
operating an additional communication device, in communication with the communication device via at least one communication channel, by:
receiving the output bitstream; and
operating a video decoder to decode the output bitstream to generate an output video signal corresponding to the input video signal, wherein the video decoder including at least one additional feedback loop having at least one additional ALF operative using only scaling processing, wherein the additional communication device is at least one of computer, a laptop computer, a high definition (HD) television, a standard definition (SD) television, a handheld media unit, a set top box (STB), or a digital video disc (DVD) player.

20. The method of claim 14, wherein the communication device is operative within at least one of a satellite communication system, a wireless communication system, a wired communication system, a fiber-optic communication system, or a mobile communication system.

\* \* \* \* \*